United States Patent Office 3,290,333
Patented Dec. 6, 1966

3,290,333
1,1-DICHLOROPERFLUOROALKYL ZINC CHLORIDES AND THEIR PREPARATION
Arnold H. Fainberg, Elkins Park, and Murray Hauptschein, Glenside, Pa., assignors to Pennsalt Chemicals Corporation, Philadelphia, Pa., a corporation of Pennsylvania
No Drawing. Filed Sept. 9, 1963, Ser. No. 307,312
14 Claims. (Cl. 260—340.6)

This invention relates to novel 1,1-dichloroperfluoroalkyl zinc chlorides and to their preparation. Particularly, the invention relates to compounds having the formula $RCF_2CCl_2ZnCl$ in which R represents F and lower perfluoroalkyl with 1 to 4 carbon atoms. More particularly, the invention relates to the novel compound 1,1-dichloro-2,2,2-trifluoroethyl zinc chloride, $CF_3CCl_2ZnCl$.

It is known in the art to prepare perfluoroalkyl zinc iodides and perfluoroalkyl zinc bromides by reaction of perfluoroalkyl bromides and perfluoroalkyl iodides, respectively, with metallic zinc in donor-type solvents such as aliphatic ethers and pyridine at or below reflux temperature of the reaction mass. See Miller et al., J.A.C.S., vol. 79 (1957), pp. 4159–74. Also, Bergman, Dissertation Abstracts XV:972 (June 1955), "Perfluoroalkyl Zinc Compounds," teaches preparation of perfluoropropyl zinc iodide, $CF_3CF_2CF_2ZnI$, from perfluoro propyl iodide, $CF_3CF_2CF_2I$ and zinc in dioxane. Bergman teaches too that $CF_3CF_2CF_2ZnI$ forms adducts with pyridine.

However, heretofore it has not been known to prepare chloroperfluoroaliphatic zinc chlorides. Thus, Miller et al. show that 1,2-dichloro-1,2,2-trifluoroiodoethane, $$CClFICClF_2$$

yields only its dehalogenation product chlorotrifluoroethylene, $CF_2=CFCl$, on treatment with zinc in a donor-type solvent. Bergman was unsuccessful in trying to form the corresponding organozinc compound from either $CBrCl_2F$, $CClFICClF_2$, $CCl_2FCH_2CF_2I$ or $$CClF_2CClFCF_2CFClI$$

We have now unexpectedly found that when a 1,1,1-trichloroperfluoroalkane having at least two carbon atoms is reacted with zinc dust in an aprotic solvent, e.g. dioxane, at an elevated temperature, the novel compound, 1,1-dichloroperfluoroalkyl zinc chloride is formed in the solvent and can be recovered from the reaction mass in the form of an adduct of the compound with the solvent.

The invention can be understood from the following equation which shows formation of 1,1-dichloroperfluoroalkyl zinc chloride:

$$RCF_2CCl_3 + Zn \xrightarrow[\text{dioxane}]{\text{heat}} RCF_2CCl_2ZnCl$$

where R is as defined above.

The process is carried out by reacting with zinc dust in an aprotic solvent at an elevated temperature a 1,1,1-trichloroperfluoroalkane having from 2 to 6 carbon atoms, inclusive, and forming in said solvent 1,1-dichloroperfluoroalkyl zinc chloride as a product.

Examples of 1,1,1-trichloroperfluoroalkanes which can be used in practicing the invention include the following:
$CF_3CCl_3$, $CF_3CF_2CCl_3$, $CF_3(CF_2)_2CCl_3$ $$CF_3(CF_2)_3CCl_3$$

and $CF_3(CF_2)_4CCl_3$.

The $CF_3CCl_3$ is especially preferred as a starting material because of its low cost. It readily is prepared by rearrangement of 1,1,2-trichloroperfluoroethane as disclosed and claimed in Hauptschein and Fainberg, U.S. Patent 3,087,974.

By an aprotic solvent is meant one incapable of acting as a proton donor. Examples of preferred aprotic solvents which can be used in practicing the invention include aliphatic and alicyclic ethers, e.g. dioxane, tetrahydrofuran, ethyl ether and dimethoxyethane; and tertiary amines, e.g. pyridine and triethylamine. Aliphatic and alicyclic ethers, e.g. dioxane and tetrahydrofuran are especially preferred as solvents.

The 1,1-dichloroperfluoroalkyl zinc chloride product is recovered in crystalline form from the reaction mass as an adduct of the aprotic solvent. In Table I are shown examples of starting materials, products and dioxane adducts of the products which are respectively used and formed in the practice of the invention.

In addition to the 1,1-dichloroperfluoroalkyl zinc chloride, a minor amount of novel 1-chloro-2,2-difluoroalkylene zinc chloride, e.g. 1 - chloro - 2,2 - difluorovinyl zinc chloride, is formed as by-product which also may be recovered in the form of its solvent adduct.

TABLE I

| Ex. No. | Starting Material | Product | Adduct |
|---|---|---|---|
| 1 | $CF_3CCl_3$ | $CF_3CCl_2ZnCl$ | $CF_3CCl_2ZnCl \cdot C_4H_8O_2$ |
| 2 | $CF_3CF_2CCl_3$ | $CF_3CF_2CCl_2ZnCl$ | $CF_3CF_2CCl_2ZnCl \cdot C_4H_8O_2$ |
| 3 | $CF_3(CF_2)_2CCl_3$ | $CF_3(CF_2)_2CCl_2ZnCl$ | $CF_3(CF_2)_2CCl_2ZnCl \cdot C_4H_8O_2$ |
| 4 | $CF_3(CF_2)_3CCl_3$ | $CF_3(CF_2)_3CCl_2ZnCl$ | $CF_3(CF_2)_3CCl_2ZnCl \cdot C_4H_8O_2$ |
| 5 | $CF_3(CF_2)_4CCl_3$ | $CF_3(CF_2)_4CCl_2ZnCl$ | $CF_3(CF_2)_4CCl_2ZnCl \cdot C_4H_8O_2$ |

The reaction between zinc dust and 1,1,1-trichloroperfluoroalkane is advantageously carried out in the temperature range from about 20° C. to about 150° C. The temperature range corresponding to the reflux temperature of the solvent used, e.g. about 100° C. for dioxane, is preferred.

Pressure is not critical and the reaction can be carried out at atmospheric, sub-atmospheric or super-atmospheric pressures. Carrying out of the reaction under atmospheric pressure conditions is preferred.

The reactants are brought together in a reaction vessel provided with heating and cooling facilities. A vessel provided with a reflux condenser is preferred.

The reaction is preferably performed by placing the zinc dust and solvent in the reaction vessel and heating the vessel's contents to reflux temperature. The 1,1,1-trichloroperfluoroalkane is then added gradually, preferably using an amount at least stoichiometrically equivalent to the amount of zinc used. The reaction mass is filtered to remove unreacted zinc dust.

The 1,1-dichloroperfluoroalkyl zinc chloride product can be used in its dissolved form in the filtrate from the reaction mass, or it can be isolated in the form of its solvent adduct. To use the product in its dissolved form, excess solvent is removed, preferably by distillation. The concentrated solution of 1,1-dichloroperfluoroalkyl zinc chloride can then be readily reacted with an appropriate reactant, to form a useful derivative. Thus it can be reacted with elemental iodine as further described in Example 7 below.

The solvent adduct of the 1,1-dichloroperfluoroalkyl zinc chloride is recovered from the reaction mass by heating the mass until most free solvent is distilled off. The residue in the vessel is then cooled. A crystalline mass of the solvent adduct is thus formed, and is purified by recrystallization from the solvent.

Upon continued heating of the crystalline solvent adduct at an elevated temperature, the adduct reacts to form ZnClF and 1,1-dichloroperfluoroalkene, releasing the solvent, substantially as described in Example 8 below. The 1,1-dichloroperfluoroalkyl zinc chloride-solvent adduct thus is useful for the preparation of known 1,1-dichloroperfluoroalkenes, e.g. $CF_2=CCl_2$, useful as monomers.

The 1,1-dichloroperfluoroalkyl zinc chloride compounds of this invention are particularly useful as chemical intermediates for the preparation of perfluorochloroalkyl iodides. These iodides are particularly useful as telogens for the preparation of valuable halogenated telomers (short-chain polymers). For example, 1,1-dichloro-2,2,2-trifluoroiodoethane, $CF_3CCl_2I$, prepared from $CF_3CCl_2ZnCl$ according to the process disclosed in Example 9 is particularly useful in the telomerization of chlorotrifluoroethylene, $CF_2=CFCl$, and of tetrafluoroethylene, $CF_2=CF_2$, to produce telomers according to the following reactions:

$$CF_3CCl_2I + CF_2=CFCl \rightarrow CF_3CCl_2[CF_2CFCl]_nI$$

where $n$ is 1 to 10.

$$CF_3CCl_2I + CF_2=CF_2 \rightarrow CF_3CCl_2[CF_2CF_2]_nI$$

where $n$ is 1 to 10.

The above reactions are described in copending application of Hauptschein and Braid, Serial No. 267,808, filed March 25, 1963 now patent No. 3,219,712.

The following examples are presented for the purpose of further illustrating the invention. It is to be understood that the invention is not intended to be restricted to these illustrative examples and that other specific embodiments within the scope and spirit of the invention are intended to be included. The parts are by weight unless otherwise stated.

*Example 6.—Preparation of $CF_3CCl_2ZnCl$ in dioxane*

70 parts of zinc dust were placed in a reaction vessel with about 600 parts of anhydrous dioxane, $(C_4H_8O_2)$; B.P. 101°–102° C. The vessel was provided with means for heating and with a reflux condenser connected to a Dry Ice-acetone cooled trap. The dioxane was heated to reflux temperature (about 102° C.). Then 280 parts of $CF_3CCl_3$ were added gradually with stirring over a period of about an hour while maintaining the reaction mass at reflux temperature. The reaction mass was then refluxed additonally for about 5 hours. The reacted mass was cooled to room temperature and filtered. The filter cake was found to consist principally of $$ZnCl_2 \cdot C_4H_8O_2$$

The filtrate was distilled at atmospheric pressure. The distillate which was recovered consisted of 120 parts of $CF_3CCl_3$ (B.P. 45°–50° C.); 8 parts of liquid boiling in the range 50–102° C.; and about 400 parts of dioxane (B.P. 102° C.) The residue in the distillation vessel was cooled to room temperature. About 140 parts of crystalline 1,1-dichloro-2,2,2-trifluoroethyl zinc chloride-dioxane adduct, $CF_3CCl_2ZnCl \cdot C_4H_8O_2$, separated from the mother liquor.

Analysis for $C_6H_8Cl_3F_3O_2Zn$.—Calculated: C, 21.15%; H, 2.36%; ionic Cl, 10.4%; total Cl, 31.2%; Zn, 19.16%. Found: C, 21.0%; H, 2.6%; ionic Cl, 10.4%; total Cl, 30.2%; Zn, 19.0%.

The infrared spectrum of $CF_3CCl_2ZnCl \cdot C_4H_8O_2$ was determined in a mineral oil mull. The characteristic peaks of the $CF_3CCl_2ZnCl$ portion of the molecule were found to be as follows: 8.02µ vvs; 8.65µ vvs; 12.3µ m; 13µ vs; 13.5µ m; and 14.7µ s. (vvs=very very strong; vs=very strong; m=medium; s=strong.)

The mother liquor remaining after recovery of $CF_3CCl_2ZnCl \cdot C_4H_8O_2$ was shown to contain $$CF_2=CClZnCl$$

having characteristic infrared spectrum peaks at 5.76µ, 8.35µ and 10.37µ.

*Example 7.—Preparation of $CF_3CCl_2I$ from $CF_3Cl_2ZnCl$ in dioxane*

172 parts of crude 1,1,1-trichloro-2,2,2-trifluoroethane, $CF_3CCl_3$, containing about 16% $CF_2ClCFCl_2$ were reacted in a reaction vessel as in Example 6 with 70 parts of zinc dust, 600 parts of dioxane and 1 part of $ZnCl_2$. The reaction mixture was cooled to 10° C. and then filtered. 665 parts of a clear yellow filtrate were recovered. The filtrate was distilled until the temperature of the material in the distilling vessel reached about 103° C. The material in the vessel was then held at reflux temperature, and 54 parts of iodine were added gradually. The reaction mass was then held at reflux temperature for about an hour. Volatile products then were distilled from the reaction vessel into a cooled receiver. These volatile products were washed with water and decolorized with aqueous $NaHSO_3$. 42 parts of a water insoluble layer were recovered. Assay of the layer showed it to consist of 5.2 parts $CF_3CCl_2I$, 10.8 parts $CF_2=CClI$, 1.9 parts $C_2Cl_3F_3$, 0.8 part $CF_3CHCl_2$ and 23.3 parts dioxane. Identity of each of the products $CF_2=CClI$ and $CF_3CCl_2I$, was confirmed by infrared spectroscopy.

The residue in the reaction vessel was cooled and the crystalline product thus recovered was identified by its infrared spectrum still to contain unreacted $$CF_3CCl_2Zncl \cdot C_4H_8O_2$$

The $CF_2=CClI$ which was present in the water-insoluble layer above arises from iodination of the compound $CF_2=CClZnCl$ which is present in the dioxane solvent. Thus, formation of $CF_2=CClI$ proceeds according to the following equation:

$$CF_2=CClZnCl + I_2 \xrightarrow{\text{dioxane}} CF_2=CClI + ZnClI.$$

*Example 8.—Thermal reaction of $CF_3CCl_2ZnCl \cdot C_4H_8O_2$*

10.3 parts (0.0303 mol) of recrystallized $$CF_3CCl_2ZnCl \cdot C_4H_8O_2$$

were placed in a drying vessel and heated under vacuum at 110° C. for a period of 40 hours. Above 7 parts of material volatilized from the flask. Analysis of this material showed that it consisted of about equimolar parts of $CF_2=CCl_2$ and dioxane. The residue in the flask was heated at 137° C. under vacuum for 20 more days, until a constant weight was attained (amounting to 3.6 parts of ZnClF (0.0302 mol). The reaction was thus found to be quantitative according to the following equation:

$$CF_3CCl_2ZnCl \cdot C_4H_8O_2 \rightarrow CF_2=CCl_2 + ZnClF + C_4H_8O_2$$

*Example 9.—Preparation of $CF_3CCl_2Br$ from $CF_3Cl_2ZnCl$ in dioxane*

300 parts of filtrate prepared as described in Example 6 and containing about 80 parts of $CF_3CCl_2ZnCl$ were reacted in a vessel with 46 parts of bromine at room temperature. The temperature of the reaction mass rose rapidly from about 23° C. to 49° C. Unreacted bromine was removed by treatment with 10% aqueous $NaHSO_3$. A water-insoluble layer containing the reaction products was recovered, washed with water and dried. The products were separated by vapor chromatography and examined by infrared spectroscopy. Among the products from the reaction mass 1-bromo-1,1-dichloro-2,2,2-trifluoroethane, $CF_3CCl_2Br$, was found and identified by its infrared spectrum. Formation of $CF_3CCl_2Br$ proceeds according to the following equation:

$$CF_3CCl_2ZnCl + Br_2 \xrightarrow{\text{dioxane}} CF_3CCl_2Br + ZnClBr$$

*Example 10.—Preparation of $CF_3CCl_2ZnCl$ in tetrahydrofuran*

100 parts of zinc dust and about 600 parts of anhydrous tetrahydrofuran ($C_4H_8O$) (B.P. 65–66° C.) were placed in a reaction vessel, as in Example 6, and heated to reflux temperature. About 187 parts of $CF_3CCl_3$ were added to the vessel over a period of about 20 minutes. The reaction mass was heated at reflux temperature for an additional 20 minutes. The mass was then cooled and filtered. 8.4 parts of solids were recovered, an indication that over 91% of the zinc had reacted. The filtrate was distilled under vacuum. About two-thirds of the filtrate, by volume, was recovered as distillate; the remainder was retained in the distilling vessel as a residue. Analysis of the distillate showed it to consist of about 97 parts of tetrahydrofuran with 1.5 parts $CF_2=CHCl$, 0.2 part $CF_3CCl_3$ and 1.2 parts $CF_3CHCl_2$. The residue was a light yellow semi-liquid mass at room temperature. The residue was dissolved in about 150 parts of tetrahydrofuran. Infrared spectrum of the residue showed the presence of $CF_3CCl_2ZnCl$; strong characteristic peaks were found at 8.0, 8.6, 13.1 and 14.7μ. Presence in the residue of some byproduct $CF_2=CClZnCl$ was shown by characteristic peaks at 5.75, 8.3 and 10.38μ.

We claim:

1. 1,1-dichloro-perfluoroalkyl zinc chloride in which the perfluoroalkyl group contains from 2 to 6 carbon atoms.
2. 1,1-dichloro-perfluoroalkyl zinc chloride-aprotic solvent adduct in which the perfluoroalkyl group contains from 2 to 6 carbon atoms.
3. 1,1-dichloro-perfluoroalkyl zinc chloride dioxanate in which the perfluoroalkyl group contains from 2 to 6 carbon atoms.
4. 1,1-dichloro-2,2,2-trifluoroethyl zinc chloride.
5. 1,1-dichloro-2,2,2-trifluoroethyl zinc chloride dioxanate.
6. 1,1-dichloro-2,2,2-trifluoroethyl zinc chloride-aprotic solvent adduct.
7. The process which consists essentially of reacting 1,1,1-trichloro-perfluoroalkane in which the alkane group contains from 2 to 6 carbon atoms with zinc in an aprotic solvent at a temperature in the range from about 20° C. to about 150° C. and forming 1,1-dichloro-perfluoroalkyl zinc chloride as a product.
8. The process according to claim 7 in which the aprotic solvent is dioxane.
9. The process according to claim 7 in which the aprotic solvent is tetrahydrofuran.
10. The process which consists essentially of reacting 1,1,1-trichloro-2,2,2-trifluoroethane with zinc in an aprotic solvent at a temperature in the range from about 20° C. to about 150° C. and forming 1,1-dichloro-2,2,2-trifluoroethyl zinc chloride as a product.
11. The process according to claim 10 in which the aprotic solvent is dioxane.
12. The process according to claim 10 in which the aprotic solvent is tetrahydrofuran.
13. The process which consists essentially of reacting 1,1,1-trichloroperfluoroalkane in which the perfluoroalkane group contains from 2 to 6 carbon atoms with zinc in an aprotic solvent at a temperature in the range from about 20° C. to about 150° C. thereby forming 1,1-dichloroperfluoroalkyl zinc chloride as a product in the solvent; evaporating uncombined solvent; and recovering 1,1-dichloroperfluoroalkyl zinc chloride-aprotic solvent adduct as product.
14. The process which consists essentially of reacting 1,1,1-trichloroperfluoroethane with zinc in dioxane at a temperature in the range from about 20° C. to about 150° C., thereby forming 1,1-dichloroperfluoroethyl zinc chloride as a product in the solvent; evaporating uncombined dioxane; and recovering 1,1-dichloroperfluoroethyl zinc chloride dioxanate.

References Cited by the Examiner
FOREIGN PATENTS 804,508  11/1958  Great Britain.

TOBIAS E. LEVOW, *Primary Examiner.*

H. M. S. SNEED, *Assistant Examiner.*